US009645253B2

(12) United States Patent
Forster

(10) Patent No.: US 9,645,253 B2
(45) Date of Patent: *May 9, 2017

(54) METHOD AND APPARATUS FOR DETECTION OF RADIOACTIVE ISOTOPES

(71) Applicant: H. LEE MOFFITT CANCER CENTER AND RESEARCH INSTITUTE, INC., Tampa, FL (US)

(72) Inventor: Kenneth M. Forster, Dallas, TX (US)

(73) Assignee: H. LEE MOFFITT CANCER CENTER AND RESEARCH INSTITUTE, INC., Tampa, FL (US)

( * ) Notice: Subject to any disclaimer, the term of this patent is extended or adjusted under 35 U.S.C. 154(b) by 641 days.

This patent is subject to a terminal disclaimer.

(21) Appl. No.: 13/857,584

(22) Filed: Apr. 5, 2013

(65) Prior Publication Data
US 2014/0326891 A1 Nov. 6, 2014

Related U.S. Application Data

(63) Continuation of application No. 13/843,140, filed on Mar. 15, 2013, now Pat. No. 9,448,309, which is a (Continued)

(51) Int. Cl.
*G01T 1/20* (2006.01)
*G01T 1/167* (2006.01)
(Continued)

(52) U.S. Cl.
CPC ............ *G01T 1/167* (2013.01); *G01T 1/17* (2013.01); *G01T 1/20* (2013.01); *G01T 1/36* (2013.01); *G01T 3/00* (2013.01); *G01V 5/0091* (2013.01)

(58) Field of Classification Search
CPC ... G01T 1/1642; G01T 1/1644; G01T 1/2018; G01T 1/20; G01T 1/204
See application file for complete search history.

(56) References Cited

U.S. PATENT DOCUMENTS 5,866,907 A * 2/1999 Drukier et al. ............... 250/366
7,330,531 B1 * 2/2008 Karellas ....................... 378/98.8
(Continued)

*Primary Examiner* — David Porta
*Assistant Examiner* — Mamadou Faye
(74) *Attorney, Agent, or Firm* — Saliwanchik, Lloyd & Eisenschenk

(57) ABSTRACT

A method and apparatus for detecting an isotope. Embodiments can detect radioactive isotopes. Embodiments can utilize a detector that incorporates at least two sub-detectors. Each sub-detector can receive energy from an isotope and create a signal corresponding to the received energy. Each sub-detector can incorporate a detector element, such as a detector element incorporating one or more diodes, a detector element incorporating a crystal, a detector element incorporating a solid-state device, or a detector element incorporating a scintillator. The sub-detectors can be configured such that for each isotope to be detected at least two of the sub-detectors produce different output signals, or readings. In an embodiment, each sub-detector is configured such that when there are at least two sub-detectors exposed to the isotope each of the corresponding readings from the sub-detectors is different from each of the other readings.

53 Claims, 2 Drawing Sheets

Related U.S. Application Data continuation of application No. PCT/US2011/055450, filed on Oct. 7, 2011.

(60) Provisional application No. 61/390,937, filed on Oct. 7, 2010.

(51) Int. Cl.
  *G01T 1/17* (2006.01)
  *G01T 1/36* (2006.01)
  *G01V 5/00* (2006.01)
  *G01T 3/00* (2006.01)

(56) References Cited

U.S. PATENT DOCUMENTS

| | | | |
|---|---|---|---|
| 7,525,083 B2* | 4/2009 | Jaeger et al. | 250/226 |
| 2001/0006215 A1* | 7/2001 | Cowan et al. | 250/393 |
| 2005/0029460 A1 | 2/2005 | Iwatschenko-Borho et al. | |
| 2005/0218329 A1* | 10/2005 | Tran | 250/356.1 |
| 2005/0248456 A1* | 11/2005 | Britton | G06Q 10/08 340/539.29 |
| 2005/0258372 A1* | 11/2005 | McGregor | G01T 1/185 250/390.01 |
| 2007/0029489 A1 | 2/2007 | Castellane et al. | |
| 2010/0019164 A1* | 1/2010 | Stephan | H01J 47/1255 250/390.04 |

\* cited by examiner

METHOD AND APPARATUS FOR DETECTION OF RADIOACTIVE ISOTOPES

CROSS-REFERENCE TO RELATED APPLICATIONS

This application is a continuation of U.S. application Ser. No. 13/843,140, filed Mar. 15, 2013, which is a continuation-in-part of International Application No. PCT/US/2011/055450, filed Oct. 7, 2011, which claims the benefit of U.S. Provisional Ser. No. 61/390,937, filed Oct. 7, 2010, which are hereby incorporated by reference in their entirety.

BACKGROUND OF INVENTION

Radioactive isotopes emit unique spectra of radiation. The spectra are defined by nuclear transitions, and sometimes by subsequent atomic transition caused by the emission of a beta particle or other nuclear decay. As the nucleus transitions from an excited state to "ground state" energy can be given off in well defined pathways. Such pathways include, but are not limited to, gamma ray emissions, beta particles (electron and positron emissions), and alpha particle emissions. Each radioactive isotope has a unique spectra which can be referred to as the isotope's characteristic spectra.

The transmission of gamma rays and particles through matter is strongly determined by the energy of the gammas or particles and the material the gamma rays and particles travel through. The number of alpha particles and electrons will be attenuated very quickly as they travel through matter, and as alpha particles and electrons travel through matter they interact with the matter, causing some additional radiation to be emitted. The subsequently emitted radiation caused by the interaction of these initial particles with the matter in which the initial particles are traveling can radiate in all directions. Accordingly, the number of particles attenuates rapidly as the particles travel through materials. Gamma rays, which are very similar to very high energy X-rays, are much less likely to interact with matter as they pass through the matter, and, therefore, are not attenuated as rapidly as they pass through matter.

The type of material the radiation passes through also affects the transmission of the radiation. Higher atomic number materials attenuate the radiation more quickly. Lead attenuates most radiation very rapidly as it has very high atomic number and density.

Spectrometers are devices that are used to determine the energies of emitted radiation. Spectrometers typically work by using a crystal (such as NaI), solid state detector, or scintillator, to detect the radiation. The radiation interacts with the crystal (or scintillator) and produces light that is fed to a photomultiplier tube, which produces an electric pulse that is proportional to the energy of the original radiation. These electrical pulses are then processed by a multi-channel analyzer that commonly converts the signal into an energy spectrum. Spectrometers can be expensive and their accuracy depends on the quality of the radiation detector. Solid state detectors can be quite accurate detectors, but also can be quite expensive.

BRIEF SUMMARY

Embodiments of the invention relate to a method and apparatus for detecting an isotope. Specific embodiments can detect radioactive isotopes. Embodiments of the invention can utilize a detector that incorporates at least two sub-detectors. Each sub-detector can receive energy from an isotope and create a signal corresponding to the received energy. Each sub-detector can incorporate a detector element, such as a detector element incorporating one or more diodes, a detector element incorporating a crystal, a detector element incorporating a solid-state device, or a detector element incorporating a scintillator.

The sub-detectors can be configured such that for each isotope to be detected at least two of the sub-detectors produce different output signals, or readings. In a specific embodiment, each sub-detector is configured such that when there are at least two sub-detectors exposed to the isotope each of the corresponding readings from the sub-detectors are different from each of the other readings. The different readings of the sub-detectors for the same isotope can be due to a filter being placed between the isotope being detected and one of the sub-detector's detector element; due to using detector elements with different detector materials, different detector designs, or other detector element differences; or other differences that produce different readings for the same radioactive isotope.

A ratio of two readings of two corresponding sub-detectors can be determined by hand via a user reading the two readings and calculating the ratio. The ratio can be determined in many other ways as well, such as, but not limited to, feeding the two readings into an analog circuit where the output is the ratio, feeding the two readings into a digital circuit where the output is the ratio, providing the two readings to a processor, such as a general purpose computer programmed for same, or a specific use processor, where the output is the ratio. Embodiments can utilize n sub-detectors, which can provide up to (n/2) (n−1) ratios. In a specific embodiment, the detector also incorporates a processor that receives two or more readings from a corresponding two or more of the at least two sub-detectors and determines a ratio of two of the two or more readings. The processor then uses the ratio of the two readings to identify the isotope. An embodiment can use a predetermined table of ratios that correlates a ratio for two specific sub-detectors to an identified radioactive isotope, such as a table look-up. In a specific embodiment, each sub-detector has a corresponding filter located to filter the radiation from the isotope such that the sub-detector's detector element is exposed to the radiation after it is filtered.

DETAILED DISCLOSURE

Figure 1:
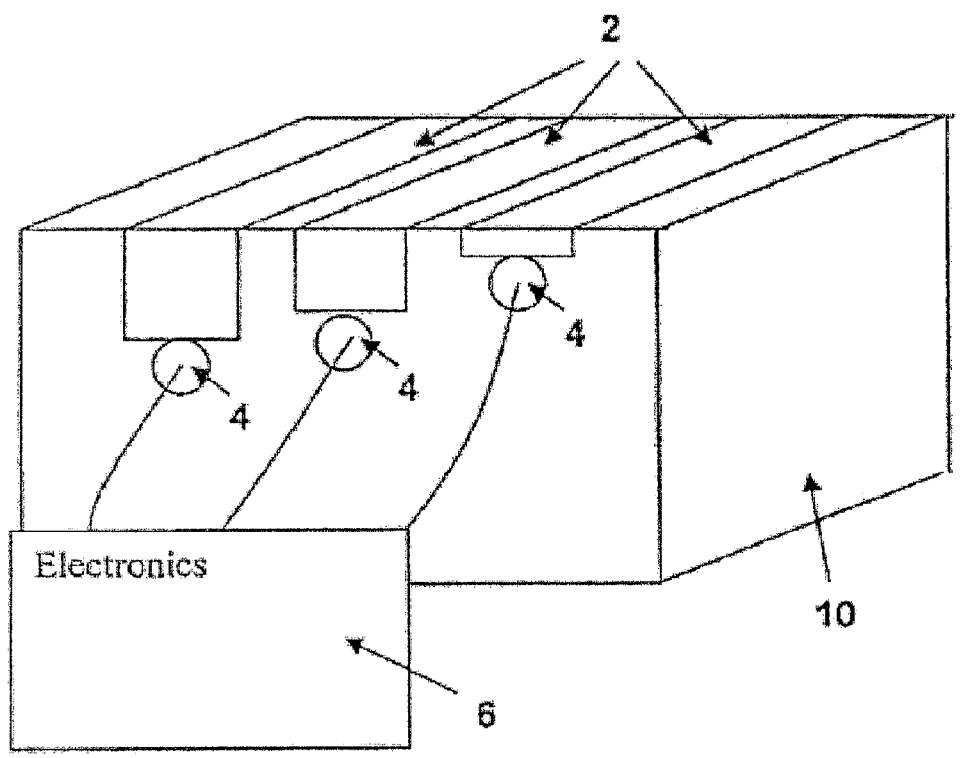
FIG. 1 shows a schematic of an embodiment of a detector in accordance with the subject invention.
Figure 2:
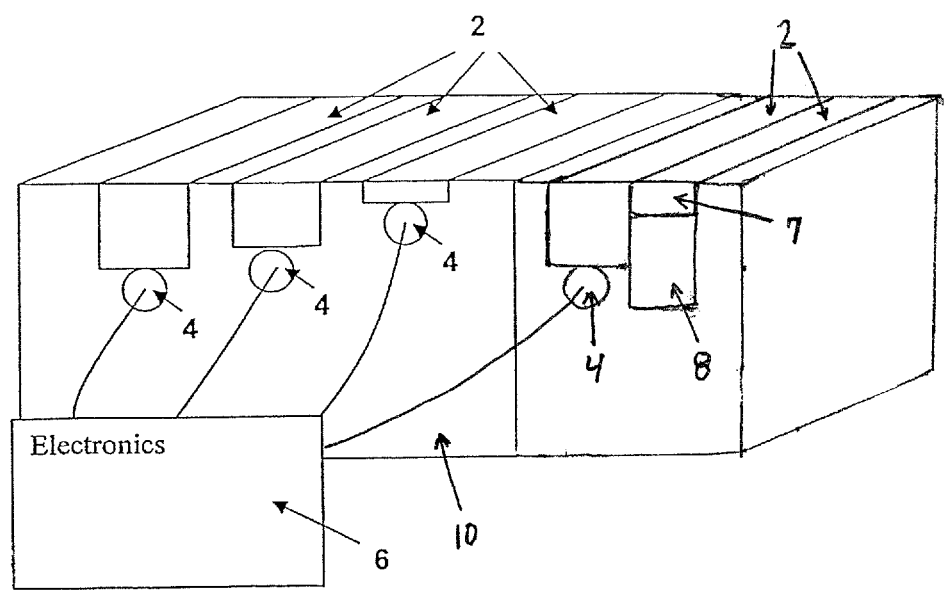
FIG. 2 shows a schematic of an embodiment of a detector in accordance with the subject invention.

Embodiments of the invention relate to a method and apparatus for detecting an isotope. Specific embodiments can detect radioactive isotopes. Embodiments of the invention can utilize a detector that incorporates at least two sub-detectors. Each sub-detector can receive radiation from an isotope and create a signal corresponding to the received radiation. Each sub-detector can incorporate a detector element, such as a detector element incorporating one or more diodes, a detector element incorporating a crystal, a detector element incorporating a solid-state device, or a detector element incorporating a scintillator. The use of ion chambers and diodes to detect radiation is well known in the art of radiation detection and can be incorporated with embodiments of the invention. In a specific embodiment, each of the sub-detectors includes a scintillator and a photomultiplier tube, such that when each sub-detector is exposed to an isotope each corresponding photomultiplier will output a corresponding reading, or signal. The output reading, or signal, can be in counts, electric current, stored charges, or other physical output.

The sub-detectors can be configured such that for each isotope to be detected at least two of the sub-detectors produce different output signals, or readings. These readings can be based on each detector element acquiring counts, current, charges, or some other physical phenomenon. In a specific embodiment, each sub-detector is configured such that when the at least two sub-detectors are exposed to the isotope each of the corresponding readings from the sub-detectors are different from each of the other readings. The different readings of the sub-detectors for the same isotope can be due to a filter being placed between the isotope being detected and one of the sub-detector's detector element; due to using detector elements with different detector materials, different detector designs, or other detector element differences; or other differences that produce different readings for the same radioactive isotope. In a specific embodiment, two sub-detectors use identical detector elements and rely on the presence of a filter positioned between a first one of the detector elements and the isotope source, either no filter or a different filter positioned between the second one of the detector elements and the isotope source. By identical detector elements, it is meant that the identical detector elements produce the same reading when exposed to the same isotope. Of course, two identical detector elements can produce slightly different readings when exposed to the same isotope and, if desired, one or both detector elements can be calibrated such that one or both detector elements can have the detector element's reading modified such that the two or more readings from the two or more identical detector elements are identical.

A ratio of two readings of two corresponding sub-detectors can be determined by hand via a user reading the two readings and calculating the ratio. As the readings can be based on each detector element acquiring counts, currents, charges, or some other physical phenomenon, the ratio of readings can be a ratio of counts, a ratio of currents, a ratio of charges, or a ratio of output readings based on some other physical phenomenon. The ratio can be determined in many other ways as well, such as, but not limited to, feeding the two readings into an analog circuit where the output is the ratio, feeding the two readings into a digital circuit where the output is the ratio, providing the two readings to a processor, such as a general purpose computer programmed for same, or a specific use processor, where the output is the ratio. Embodiments can utilize n sub-detectors, which can provide up to (n/2) (n−1) ratios. In a specific embodiment, the detector also incorporates a processor that receives two or more readings from a corresponding two or more of the at least two sub-detectors and determines a ratio of two of the two or more readings. The processor then uses the ratio of the two readings to identify the isotope. An embodiment can use a predetermined table of ratios that correlates a ratio for two specific sub-detectors to an identified radioactive isotope, such as a table look-up. In a specific embodiment, each sub-detector has a corresponding filter located to filter the radiation from the isotope such that the sub-detector's detector element is exposed to the radiation after it is filtered.

FIG. 1 shows a schematic of an embodiment of a detector 10 in accordance with the subject invention. The device can be integrated into a single handheld unit. The handheld unit can attach to, for example, a personal computer (PC) or can incorporate an onboard processor, such as an integrated circuit. Embodiments of the invention utilize two or more sub-detectors. A specific embodiment can include 3 or 4 sub-detectors. The embodiment shown in FIG. 1 incorporates 3 sub-detectors. A further specific embodiment can use 5-10 sub-detectors, or more, depending on the specific application. Various types of sub-detectors detector elements can be used, including, but not limited to, scintillator and photomultiplier, ion chamber, diodes, or other radiation detectors or spectrometers. In a specific embodiment, each sub-detector can incorporate a diode, ion chamber, or scintillation detector 4.

The embodiment shown in FIG. 1 incorporates three filters 2 and three detector elements 4. The detector elements can be, but are not limited to, one of the following: diodes, ion chambers, or simple scintillators attached to three photomultiplier tubes. Each sub-detector can also incorporate a readout circuit. In a specific embodiment, the embodiment shown in FIG. 1 incorporates three identical diodes and three identical readout circuits, with a different filter for each sub-detector. Alternative embodiments can use different detector elements in one or more of the sub-detectors. A processor can receive the signals from each sub-detector, such as from readout circuits of the sub-detectors, and produce a reading for each sub-detector. The ratios of readings for various known radioactive isotopes can be measured and used to determine the source of radiation hitting the detector 10 during operation.

In a specific embodiment, the sub-detectors in FIG. 1 are in a block of metal with a different filter in front of each detector element. The filters are chosen to produce unique ratios of readings between one or more pairs of sub-detectors depending on the radiation source.

The filters in front of the scintillators can incorporate a variety of materials, including, but not limited to, tungsten, aluminum, copper, and lead.

Depending on the application, a specific embodiment of the subject detector can be designed for detecting high energy isotopes. In a specific embodiment, such a detector for detecting high energy isotopes can detect isotopes in the range of 0.2 MeV to 1 MeV, 1 MeV to 2 MeV, or higher. An alternative embodiment can be designed for low energy isotopes. In a specific embodiment, such a detector for detecting low energy isotopes can detect isotopes in the range of 10 KeV to 50 KeV.

Further embodiments can be designed for specific uses, such as a hospital setting where one of several isotopes may be present in separate packages and the detector is used to confirm which isotope is in one or more of the packages. Another embodiment can be used to identify radioactive isotopes that can be used for "dirty" bombs. Since only a few isotopes can be used to create a "dirty" bomb, a detector 10 can be constructed, for example by utilizing a unique set of sub-detector filter combinations, such that the primary purpose of the detector is the identification of the presence of one or more of the few isotopes that can be used to build a "dirty" bomb. As an example, a specific embodiment is designed to detect Cs. A further specific embodiment is designed to detect Cs137. Embodiments can be used to detect one or more radioactive isotopes that have characteristic spectra, including, but not limited to, Pd-123, I-125, Co-60, Mn-54, Co-57, Y-90, and Cd-109. From the ratio of the readings during the operation of the detector 10 the radiation source can be detected. In a specific embodiment, multiple ratios from n sub-detectors are obtained and used together, such as by averaging, in order to identify the isotope.

Embodiments create the ratio of readings, or signals, for two or more sub-detectors by designing filters in front of the sub-detector detector elements such that the sub-detectors give different readings when exposed to an isotope. In a preferred embodiment, the sub-detectors are simultaneously exposed to the isotope. In alternative embodiments, a common detector element can be used and two or more different filters can be sequentially placed in front of the detector element to produce a corresponding two or more readings. Ratios of two of the two or more readings can then be used to detect an isotope. Such different readings can result from, but are not limited to, one or more of the following differences between sub-detectors: different filter material, different detector element design, different material, different scintillator design, different filter thickness between isotope source and detector element, and different filter design. Examples of different filter design include taking a measurement with a detector having a detector element and a filter and then at a later time taking a second measurement with the same detector having the same detector element with the detector rotated such that the same filter is now at a different angle such that the filter is in a sense a different filter, in order to get a ratio between the two signals. For example, if a rectangular filter of thickness, t is used for a first measurement where the radiation is hitting the filter normal to the surface, and then the filter is rotated 45° such that the radiation hits the filter at 45° and the effective thickness of filter is t times the square root of 2.

The ratios of readings, or signals, from different sub-detectors can be determined empirically and/or theoretically. If a filter is used with a sub-detector, the attenuation of the filter can be determined empirically, theoretically, and/or from data provided by National Institute of Standards and Technology (NIST), such as on the NIST website. In a specific embodiment, the detector elements are empirically calibrated to produce calibration factors that are unique to each detector element. In another specific embodiment, each sub-detector is calibrated to produce a calibration factor. These detector element calibration factors, sub-detector calibration factors, and/or filter attenuations can be stored in a processor that can also receive the readings from the sub-detectors and/or detector elements. The processor can then apply the calibration factor prior to, or after, determination of the desired ratios. A specific embodiment of the device can allow the user to examine a radioactive source (isotope) that is in a shielded container used to ship radioactive isotopes. Modified lookup tables can be used to adjust for the lower output signal due to the reduced radiation reaching the detector. In a specific embodiment, a detector incorporates a plurality of sub-detectors, such as three, for detecting radiation in a high energy range, such as 0.2 MeV to 2 MeV, and another plurality of sub-detectors, such as three, for detecting radiation in a low energy range, such as 10 keV to 50 keV, where certain isotopes are detected by the first plurality of sub-detectors and certain other isotopes are detected by the second plurality of sub-detectors.

By incorporating three or more sub-detectors, a detector can have three or more ratios of readings to use to identify the isotope under study. Three sub-detectors can create up to three ratios of readings, four sub-detectors can create up to six ratios of readings, and n sub-detectors can create up to $(n/2)(n-1)$ ratios of readings. Accordingly, for detectors incorporating three or more sub-detectors, a combination of two or more ratios of readings may be used for identifying an isotope.

Specific embodiments of the invention relate to incorporating a filter that incorporate an activation foil 8 in front of the subdetector elements 4 such that neutrons given off by a radioactive isotope interact with the nucleus of the activation foil causing the nucleus to be in an unstable state. The nucleus of the activation foil then decays releasing a gamma particle. The gamma particle can then be detected by the subdetector elements as disclosed in the subject disclosure. The presence of, or amount of, neutrons can be used to distinguish between two isotopes that have the same ratio of signals between two subdetectors, or one subdetector in two states, without the activation foil present, as the neutrons would be undetected without the activation foil. Accordingly, the ratio of the signals is augmented by placing a filter with an activation foil. Further specific embodiments can also place a moderator 7 in front of the activation foil, such that the neutrons pass through the moderator before reaching the activation foil. The moderator can slow the neutrons, which increases the likelihood of an interaction with the activation foil. This is because the neutrons are slowed increasing the cross section (i.e., barns) of the activation foil. Accordingly, the moderator can further augment the ratio of the two signals.

Examples of materials that can be used as actuation foils include, but are not limited to, Au-197, In-115, and Dy-164. Examples of materials that can be used as moderator include, but are not limited to, Teflon and polyethylene.

Aspects of the invention, such as processing readings for detector elements and determining one or more ratios of pairs of the readings, and/or outputting a signal indicative of detection of one or more isotopes, may be implemented in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A detector, comprising:
    at least two sub-detectors,
        wherein the at least two sub-detectors are configured such that when the at least two sub-detectors are exposed to radiation from a radioactive isotope the at least two sub-detectors will output a corresponding at least two signals, and
        wherein a ratio of a pair of the at least two signals identifies two radioactive isotopes;
    a first additional sub-detector,
        wherein the first additional sub-detector comprises a first filter having a first activation foil, and
        wherein when the first additional sub-detector is exposed to radiation from the radioactive isotope the first additional sub-detector will output a first additional signal that indicates whether neutrons are present in the radiation from the radioactive isotope; and
    a processor,
        wherein the processor is configured to:
            (i) receive two or more of the at least two signals;
            (ii) receive the first additional signal;
            (iii) determine a ratio of a pair of the two or more of the at least two signals;
            (iv) use the ratio of the pair of the two or more of the at least two signals to identify the two radioactive isotopes; and
            (v) use the first additional signal to determine whether neutrons are present in the radiation from the radioactive isotope and distinguish between the two radioactive isotopes based on whether neutrons are present in the radiation from the radioactive isotope to identify the radioactive isotope.

2. The detector according to claim 1,
wherein each of the corresponding at least two signals are different from each other.

3. The detector according to claim 1,
wherein the at least two sub-detectors comprise:
    a corresponding at least two detector elements,
        wherein the at least two detector elements output a corresponding at least two signals when the at least two sub-detectors are exposed to the radiation from the radioactive isotope.

4. The detector according to claim 3,
wherein one or more of the at least two sub-detectors further comprises:
    a corresponding one or more filters,
        wherein the one or more filters alter the signals of the corresponding one or more detector elements when the at least two sub-detectors are exposed to the radiation from the radioactive isotope.

5. The detector according to claim 3,
wherein one or more of the at least two detector elements comprise a corresponding one or more diodes.

6. The detector according to claim 3,
wherein one or more of the at least two detector elements comprise a corresponding one or more ion chambers.

7. The detector according to claim 3,
wherein one or more of the at least two detector elements comprise a corresponding one or more scintillators.

8. The detector according to claim 7,
wherein the one or more of the at least two detector elements comprise:
    a corresponding one or more photomultiplier tubes,
        wherein the corresponding one or more photomultiplier tubes output a corresponding one or more of the at least two signals when the at least two sub-detectors are exposed to the radiation from the radioactive isotope.

9. The detector according to claim 1,
wherein the radiation from the radioactive isotope comprises one or more of the following:
gamma rays, beta particles (electrons), beta particles (positrons), and alpha particles.

10. The detector according to claim 1,
wherein the at least two sub-detectors comprises three sub-detectors.

11. The detector according to claim 1,
wherein the at least two sub-detectors comprises four to ten sub-detectors.

12. The detector according to claim 3,
wherein the at least two detector elements comprise a corresponding at least two diodes.
13. The detector according to claim 4,
wherein each of the one or more filters is different from each of the other one or more filters.
14. The detector according to claim 13,
wherein each of the at least two detector elements are the same.
15. The detector according to claim 1,
wherein the detector is configured to detect any of a plurality of known radioactive isotopes corresponding to a plurality of ratios, and
wherein each ratio of the plurality of ratios is different from each of the other ratios of the plurality of ratios.
16. The detector according to claim 4,
wherein each of the one or more filters comprises a material selected from the group consisting of: tungsten, aluminum, copper, and lead.
17. The detector according to claim 1,
wherein the detector is configured to detect a radioactive isotope having radiation from the radioactive isotope with energies in the range of 0.2 MeV to 1 MeV.
18. The detector according to claim 1,
wherein the detector is configured to detect a radioactive isotope having radiation from the radioactive isotope with energies in the range of 1 MeV to 2 MeV.
19. The detector according to claim 1,
wherein the detector is configured to detect a radioactive isotope having radiation from the radioactive isotope with energies in the range of 10 KeV to 50 KeV.
20. The detector according to claim 1,
wherein the radioactive isotope is Cs.
21. The detector according to claim 1,
wherein the at least two signals are produced based on simultaneous exposure of the at least two sub-detectors to the radiation from the radioactive isotope.
22. The detector according to claim 1,
wherein the at least two sub-detectors are n sub-detectors, where n is a positive integer greater than 1, and
wherein the corresponding n signals result in $(n/2)(n-1)$ ratios.
23. The detector according to claim 1,
wherein at least one ratio, for a pair of the at least two sub-detectors corresponding to the pair of the two or more of the at least two signals, corresponding to at least one radioactive isotope is stored in a memory, and
wherein the processor compares the ratio of the pair of the two or more of the at least two signals with one or more of the at least one ratio to identify the radioactive isotope.
24. The detector according to claim 1,
wherein the radioactive isotope is selected from the group consisting of:
Pd-123, I-125, Co-60, Mn-54, Co-57, Y-90, and Cd-109.
25. The detector according to claim 1,
wherein the radioactive isotope is selected from radioactive isotopes that have a characteristic spectrum.
26. A method of detecting a radioactive isotope, comprising:
providing at least two sub-detectors,
wherein the at least two sub-detectors are configured such that when the at least two sub-detectors are exposed to radiation from a radioactive isotope the at least two sub-detectors output a corresponding at least two signals, and
wherein a ratio of a pair of the at least two signals identifies two radioactive isotopes;
providing a first additional sub-detector,
wherein the first additional sub-detector comprises a first filter having a first activation foil, and
wherein when the first additional sub-detector is exposed to radiation from the radioactive isotope the first additional sub-detector will output a first additional signal that indicates whether neutrons are present in the radiation from the radioactive isotope;
exposing the at least two sub-detectors and the first additional sub-detector to radiation from the radioactive isotope;
identifying the two radioactive isotopes via the ratio of a pair of the at least two signals;
determining whether neutrons are present in the radiation from the radioactive isotope via the first signal; and
distinguishing between the two radioactive isotopes based on whether neutrons are present in the radiation from the radioactive isotope to identify the radioactive isotope.
27. The method according to claim 26, further comprising:
providing a processor,
wherein the processor receives two or more of the at least two signals and determines a ratio of a pair of the two or more of the at least two signals,
wherein the processor receives the first additional signal;
wherein the processor uses the ratio of the pair of the two or more of the at least two signals to identify the two radioactive isotopes, and
wherein the processor uses the first additional signal to determine whether neutrons are present in the radiation from the radioactive isotope and distinguishes between the two radioactive isotopes based on whether neutrons are present in the radiation from the radioactive isotope to identify the radioactive isotope.
28. The method according to claim 26,
wherein each of the corresponding at least two signals are different from each other.
29. The method according to claim 26,
wherein the at least two sub-detectors comprise:
a corresponding at least two detector elements,
wherein the at least two detector elements output a corresponding at least two signals when the at least two sub-detectors are exposed to the radiation from the radioactive isotope.
30. The method according to claim 29,
wherein one or more of the at least two sub-detectors further comprises:
a corresponding one or more filters,
wherein the one or more filters alter the signals of the corresponding one or more detector elements when the at least two sub-detectors are exposed to the radiation from the radioactive isotope.
31. The method according to claim 29,
wherein one or more of the at least two detector elements comprise a corresponding one or more diodes.
32. The method according to claim 29,
wherein one or more of the at least two detector elements comprise a corresponding one or more ion chambers.
33. The method according to claim 29,
wherein one or more of the at least two detector elements comprise a corresponding one or more scintillators.
34. The method according to claim 33,
wherein the one or more of the at least two detector elements comprise:

a corresponding one or more photomultiplier tubes,
wherein the corresponding one or more photomultiplier tubes output a corresponding one or more of the at least two signals when the at least two sub-detectors are exposed to the radiation from the radioactive isotope.

35. The method according to claim 26,
wherein the radiation from the radioactive isotope comprises one or more of the following:
gamma rays, beta particles (electrons), beta particles (positrons), and alpha particles.

36. The method according to claim 26,
wherein the at least two sub-detectors comprises three sub-detectors.

37. The method according to claim 26,
wherein the at least two sub-detectors comprises four to ten sub-detectors.

38. The method according to claim 29,
wherein the at least two detector elements comprise a corresponding at least two diodes.

39. The method according to claim 30,
wherein each of the one or more filters is different from each of the other one or more filters.

40. The method according to claim 39,
wherein each of the at least two detector elements are the same.

41. The method according to claim 26,
wherein the detector is configured to detect any of a plurality of known radioactive isotopes corresponding to a plurality of ratios, and
wherein each ratio of the plurality of ratios is different from each of the other ratios of the plurality of ratios.

42. The method according to claim 30,
wherein each of the one or more filters comprises a material selected from the group consisting of: tungsten, aluminum, copper, and lead.

43. The method according to claim 26,
wherein the detector is configured to detect a radioactive isotope having radiation from the radioactive isotope with energies in the range of 0.2 MeV to 1 MeV.

44. The method according to claim 26,
wherein the detector is configured to detect a radioactive isotope having radiation from the radioactive isotope with energies in the range of 1 MeV to 2 MeV.

45. The method according to claim 26,
wherein the detector is configured to detect a radioactive isotope having radiation from the radioactive isotope with energies in the range of 10 KeV to 50 KeV.

46. The method according to claim 26,
wherein the radioactive isotope is Cs.

47. The method according to claim 26,
wherein the at least two signals are produced based on simultaneous exposure of the at least two sub-detectors to the radiation from the radioactive isotope.

48. The method according to claim 26,
wherein the at least two sub-detectors are n sub-detectors, where n is a positive integer greater than 1, and
wherein the corresponding n signals result in $(n/2)(n-1)$ ratios.

49. The method according to claim 27,
wherein at least one ratio, for a pair of the at least two sub-detectors corresponding to the pair of the two or more of the at least two signals, corresponding to at least one radioactive isotope is stored in a memory, and
wherein the processor compares the ratio of the pair of the two or more of the at least two signals with one or more of the at least one ratio to identify the radioactive isotope.

50. The method according to claim 26,
wherein the radioactive isotope is selected from the group consisting of:
Pd-123, I-125, Co-60, Mn-54, Co-57, Y-90, and Cd-109.

51. The method according to claim 26,
wherein the radioactive isotope is selected from radioactive isotopes that have a characteristic spectrum.

52. The detector according to claim 1,
wherein the first additional sub-detector comprises a first moderator positioned such that the radiation from the isotope interacts with the first moderator before interacting with the first activation foil.

53. The method according to claim 26,
wherein the first additional sub-detector comprises a first moderator positioned such that the radiation from the isotope interacts with the first moderator before interacting with the first activation foil.

* * * * *